Patented Dec. 20, 1932

1,891,677

UNITED STATES PATENT OFFICE

LEOPOLD LASKA AND OSKAR HALLER, OF OFFENBACH-ON-THE-MAIN, GERMANY, ASSIGNORS TO GENERAL ANILINE WORKS, INC., OF NEW YORK, N. Y., A CORPORATION OF DELAWARE

NEW SUBSTITUTED PHENOL-CARBOXYLIC ACIDS AND PROCESS OF MAKING SAME

No Drawing. Application filed March 19, 1931, Serial No. 523,934, and in Germany April 3, 1930.

Our present invention relates to substituted phenol-carboxylic acids and to a process of making them.

The process of manufacture in accordance with this invention comprises heating an alkali metal salt of a substituted phenol of the general formula:

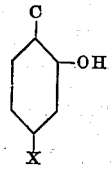

wherein X represents chlorine or a methyl group, with carbon dioxide at a raised pressure.

According to the above formula, the phenols used as parent materials are 1-chloro-4-methyl-2-hydroxybenzene and 1.4-dichloro-2-hydroxybenzene.

Since the carboxylic acids made in accordance with the invention exhibit an intense violet color when mixed with ferric chloride, it is to be presumed that the carboxylic acid group has entered the free ortho-position relatively to the hydroxy group. According to this assumption, the new acids obtained by the present invention would correspond with the general formula:

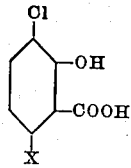

wherein X has the aforesaid significance.

Thus the process represents the rare case of a smooth formation of a 1.2.3.4-substituted benzene.

The new carboxylic acids are valuable intermediates for the production of dyestuffs.

In order to further illustrate our invention the following examples are given, the parts being by weight and all temperatures in centigrade degrees, but we wish it to be understood that we are not limited to the particular products or reaction conditions mentioned therein:

Example 1

163 parts of 1.4-dichloro-2-hydroxybenzene are dissolved in 56 parts of caustic potash and 300 parts of water in an autoclave provided with a stirrer, and the water is distilled off, finally under reduced pressure, until the mass becomes entirely dry. Into the cold reaction mass carbon dioxide is introduced until a pressure of 40 atmospheres is attained and the whole is heated at 140–150° C. for 8 hours. After cooling, the mass is dissolved in hot water, the solution is filtered and the 1.4-dichloro-2-hydroxybenzene-carboxylic acid is precipitated from the filtrate by means of hydrochloric acid. When recrystallized from water it melts at 187° C. The alcoholic solution of this acid yields a violet coloration after the addition of a dilute solution of ferric chloride.

The process may be applied in like manner to the sodium salt of 1.4-dichloro-2-hydroxybenzene.

Example 2

142.5 parts of 4-methyl-1-chloro-2-hydroxybenzene are dissolved in 66 parts of caustic potash and 500 parts of water in an autoclave provided with a stirrer, and the water is distilled off, finally under reduced pressure, until the mass becomes entirely dry. Into the cold reaction mass carbon dioxide is introduced until a pressure of 10 atmospheres is attained and the whole is heated at 120–130° C. for 10 hours. After cooling, the mass is dissolved in hot water, the solution is filtered and the 4-methyl-1-chloro-2-hydroxybenzene-carboxylic acid is precipitated from the filtrate by means of hydrochloric acid. For further purification, it is dissolved in sodium carbonate solution and re-precipitated therefrom by means of an acid. When recrystallized from dilute alcohol it melts at 174° C. The alcoholic solution of this acid yields an intense violet coloration after the addition of a dilute solution of ferric chloride.

The process may be applied in like manner to the sodium salt of 4-methyl-1-chloro-2-hydroxy-benzene.

We claim:

1. A process for the manufacture of new substituted phenol-carboxylic acids which comprises heating at a temperature of about 120° C. to 150° C. an alkali metal salt of a substituted phenol of the general formula:

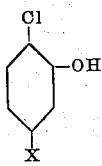

wherein X represents chlorine or a methyl group, with carbon dioxide at a pressure of about 10 to 50 atmospheres.

2. A process for the manufacture of a new dichloro-phenol-carboxylic acid which comprises heating at a temperature of 140° C. to 150° C. an alkali metal salt of 2.5-dichloro-phenol of the formula

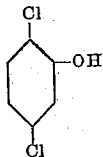

with carbon dioxide at a pressure of 40 atmospheres.

3. A process for the manufacture of a new chloro-methyl-phenol-carboxylic acid which comprises heating at a temperature of 120° C. to 130° C. an alkali metal salt of 2-chloro-5-methyl-phenol of the formula:

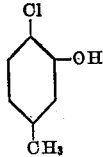

with carbon dioxide at a pressure of 10 atmospheres.

4. As new compounds the substituted phenol carboxylic acids of the probable general formula:

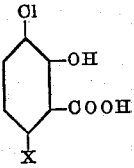

wherein X represents chlorine or a methyl group, which compounds represent when dry nearly colorless substances, having a definite melting point, soluble in alkalies, showing when dissolved in alcohol a violet coloration after the addition of a dilute solution of ferric chloride.

5. As a new compound the dichloro-phenol-carboxylic acid of the probable formula:

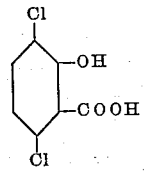

which compound represents when dry a nearly colorless substance melting when recrystallized from water at 187° C., soluble in alkalies, showing when dissolved in alcohol a violet coloration after the addition of a dilute solution of ferric chloride.

6. As a new compound the chloro-methyl-phenol-carboxylic acid of the probable formula:

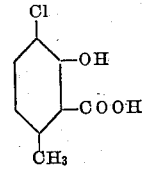

which compound represents when dry a nearly colorless substance melting when recrystallized from dilute alcohol at 174° C., soluble in alkalies, showing when dissolved in alcohol a violet coloration after the addition of a dilute solution of ferric chloride.

In testimony whereof, we affix our signatures.

LEOPOLD LASKA.
OSKAR HALLER.